(12) United States Patent
Hutchins

(10) Patent No.: US 8,047,450 B2
(45) Date of Patent: Nov. 1, 2011

(54) TEMPERATURE RESPONSIVE FLOW CONTROL VALVE FOR AN ENGINE COOLING SYSTEM

(75) Inventor: William Richard Hutchins, Kenilworth (GB)

(73) Assignee: Ford Global Technologies, LLC, Dearborn, MI (US)

( * ) Notice: Subject to any disclaimer, the term of this patent is extended or adjusted under 35 U.S.C. 154(b) by 434 days.

(21) Appl. No.: 12/327,556

(22) Filed: Dec. 3, 2008

(65) Prior Publication Data
US 2009/0145374 A1    Jun. 11, 2009

(30) Foreign Application Priority Data

Dec. 7, 2007    (GB) .................................. 0723865.2

(51) Int. Cl.
*G05D 23/02*    (2006.01)
*G05D 23/08*    (2006.01)
*F01P 7/02*    (2006.01)
*F01P 7/14*    (2006.01)

(52) U.S. Cl. ................ 236/93 A; 236/93 R; 236/101 C; 123/41.05; 123/41.1

(58) Field of Classification Search ................ 236/93 A, 236/93 R, 101 R, 101 C, 101 D; 123/41.05, 123/41.08, 41.09, 41.1
See application file for complete search history.

(56) References Cited

U.S. PATENT DOCUMENTS
7,082,903 B2 *   8/2006   Hutchins ...................... 123/41.1

FOREIGN PATENT DOCUMENTS
GB        2401166         11/2004

OTHER PUBLICATIONS

United Kingdom Intellectual Property Office International Search Report of GB0723865.2, Apr. 9, 2008, 1 page.

* cited by examiner

*Primary Examiner* — Chen Wen Jiang
(74) *Attorney, Agent, or Firm* — Allan J. Lippa; Alleman Hall McCoy Russell & Tuttle LLP

(57) ABSTRACT

A temperature responsive control valve is disclosed. The valve may have a housing having a hot inlet, a cold inlet and an outlet. A first valve member, and a second valve member, may be configured to move within the housing to selectively prevent and permit flow from the hot inlet and the cold inlet to the outlet when a sensed temperature is within predetermined ranges. A temperature responsive actuator may be disposed to move the first and second valve members within the housing in accordance with the sensed temperature. A first bias may be configured to bias the first valve member toward preventing flow from the hot inlet to the outlet, and a second bias may be configured to bias the second valve member toward preventing flow from the cold inlet to the outlet.

17 Claims, 2 Drawing Sheets

TEMPERATURE RESPONSIVE FLOW CONTROL VALVE FOR AN ENGINE COOLING SYSTEM

CROSS REFERENCE TO PRIORITY APPLICATION

This present application claims priority to United Kingdom Application Number 0723865, filed Dec. 5, 2007, entitled "Temperature Responsive Flow Control Valve for an Engine Cooling System", naming William Richard Hutchins as the inventor, the entire contents of which are incorporated herein by reference.

FIELD

This invention relates to thermostatically controlled valves and in particular to temperature responsive control valves for use in engine cooling systems, particularly but not exclusively, engine cooling systems for motor vehicles.

BACKGROUND/SUMMARY

Typically, an engine cooling system has a pump to circulate coolant used to cool the engine, a radiator to cool the coolant and a bypass to allow coolant to circulate through the engine without being cooled by the radiator. In motor vehicles, a cabin heater is usually, provided so that the coolant warmed by the engine provides heating for any occupants of the vehicle. Additionally, the main engine coolant is often used to cool one or more additional heat exchangers or radiators such as a transmission oil cooler, a fuel cooler or an air-charge cooler. A temperature responsive control valve is provided to control the flow of coolant through the radiator and frequently also to control the flow of coolant through the bypass.

GB2401166A describes a temperature responsive flow control valve in which a housing has a hot inlet for connection to a bypass receiving hot coolant from an engine, a cold inlet for connection to a radiator and an outlet for a pumped return to the engine. A thermostat capsule has a pushrod which reacts against a spoked abutment and carries a flange which is a running clearance in a bore of the housing leading from the cold inlet. The capsule is carried in a valve spool having a flange with a seat which seals against the housing. When coolant in the hot inlet is below 80° C., the valve prevents flow from the hot and cold inlets and to the outlet but as the temperature rises above 80° the valve spool moves progressively towards the hot inlet to allow flow past the seat to allow flow from the hot inlet to the outlet. Further movement of the valve spool with increasing temperature at the hot inlet brings the flange out of the bore in the cold inlet to allow flow through the cold inlet past the flange.

However, the inventors herein have recognized several issues with such an approach. As one example, even though the pressure at the cold inlet is substantially the same as that at the outlet, if there is an excessive clearance between the flange and the bore in the cold inlet, there can be unwanted flow through the cold inlet even if the flange is still in the bore of the cold inlet.

Thus, in one example, the above issues may be addressed by providing a temperature responsive control valve for use in an engine cooling system where the above problem is eliminated or minimised. The temperature responsive control valve for use in an engine cooling system in which a pump circulates liquid coolant to an engine, coolant from the engine is returned to the pump through a radiator and a bypass arranged in parallel and the control valve controls flow as between the radiator and the bypass, the control valve having a housing defining a hot inlet which in use is connected to the bypass, a cold inlet which in use is connected to the radiator, an outlet which in use is connected to the pump, a first valve member to control the flow of coolant from the hot inlet to the outlet, a second valve member to control coolant flow from the cold inlet to the outlet and a temperature responsive actuator to move the first and second valve members, wherein the control valve is operable to substantially prevent coolant flow from the hot and cold inlets to the outlet when the temperature of the coolant sensed by the temperature responsive actuator is below a first predetermined temperature, to permit coolant flow only from the hot inlet to the outlet when the sensed temperature is between the first predetermined temperature and a second higher predetermined temperature and to permit coolant flow from both of the inlets to the outlet when the sensed temperature is above the second temperature, wherein the second valve member is spring biased onto a seat in the housing to prevent coolant flow from the cold inlet to the outlet when the temperature of the coolant sensed by the temperature responsive actuator is below the second predetermined temperature and is lifted from the seat by the first valve member when the temperature of the coolant sensed by the temperature responsive actuator exceeds the second predetermined temperature.

In some examples there may be a lost motion connection between the first valve member and the second valve member. A biasing spring may act between the first valve member and the second valve member.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
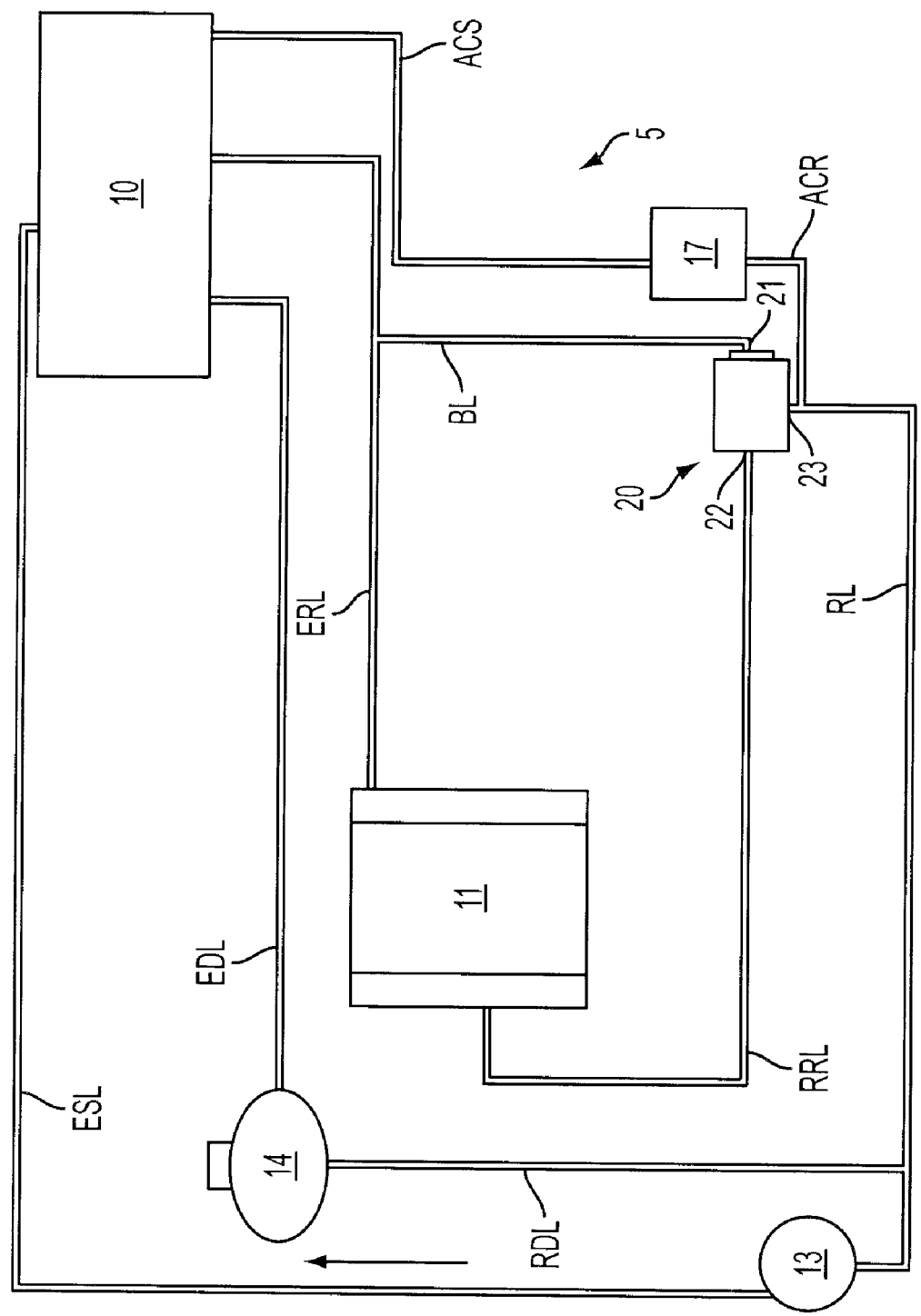
FIG. 1 is a schematic diagram illustrating an example temperature control valve in accordance with the disclosure, shown in an example application for use in an engine cooling system.

FIG. 1 is a schematic view illustrating an engine cooling system 5 comprises a primary cooling circuit having pump 13 for circulating liquid coolant to an engine 10 through an engine supply line ESL. Coolant from the engine 10 is returned to the pump 13 through an engine return line ERL, through a radiator 11 and a bypass BL arranged in parallel and a pump return line RL. A temperature responsive control valve 20 controls flow as between the radiator 11 and the bypass BL and has a first or hot inlet 21 connected to the bypass BL, a second or cold inlet 22 connected by a radiator return line RRL to the outlet from the radiator 11 and an outlet 23 connected to the pump return line RL. A temperature-responsive control valve fitted in this location in an engine cooling system is usually simply known as a thermostat and where appropriate this term will be used for convenience.

An auxiliary or heater circuit has a liquid to air heat exchanger in the form of a cabin heater 17, coolant being taken directly from the engine 10 through an auxiliary circuit supply line ACS and returned to the primary circuit by an auxiliary circuit return line ACR connected to the return line RL. The primary cooling circuit also includes a degas or expansion tank 14 connected to the engine through an engine degas line EDL and to the pump return line RL through a return degas line RDL.

Figure 2:
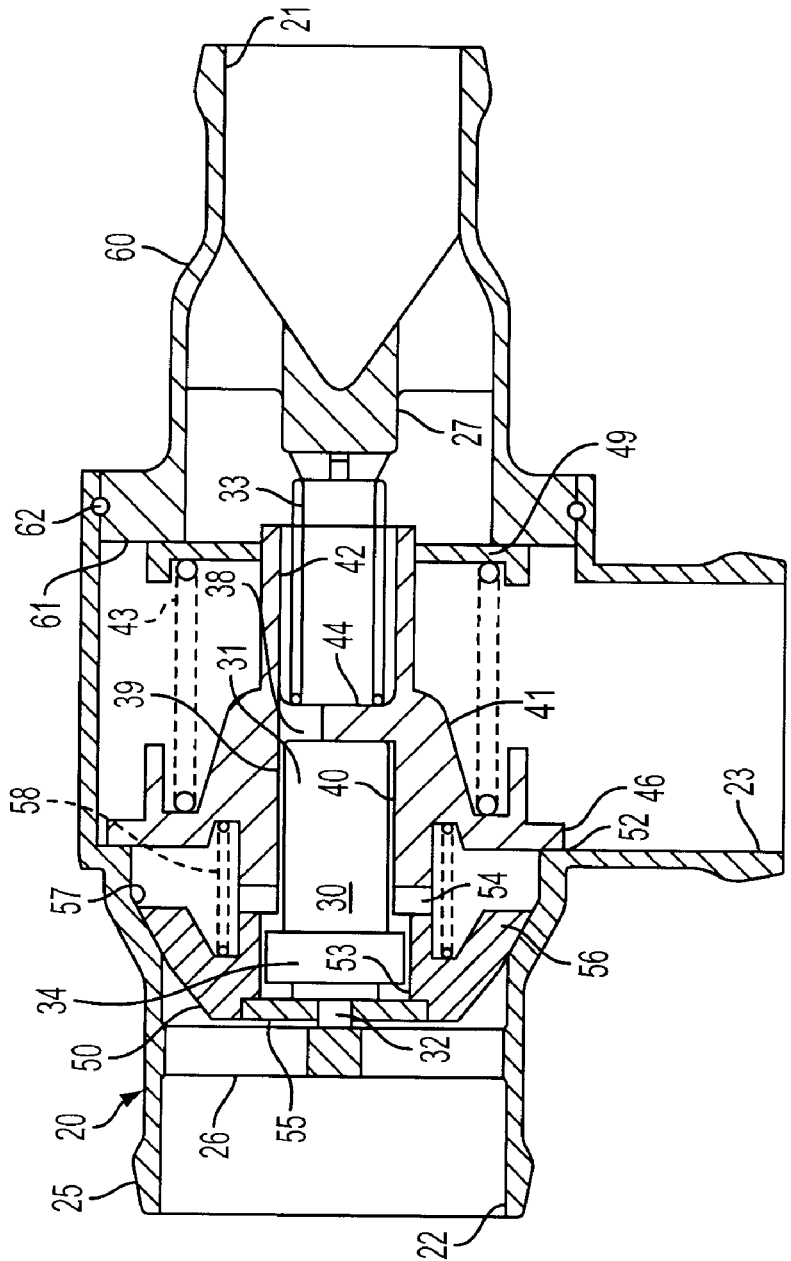
FIG. 2 is cross-section through the temperature sensitive control valve according to the invention.

FIG. 2 is cross-section through the temperature sensitive control valve according to the invention. A temperature responsive flow control valve 20 has a housing comprising a main housing 25 and an end housing 60. The end housing 60 has a hot inlet 21 for connection to a bypass receiving hot coolant from an engine while the main housing 25 has a cold inlet 22 connected to a radiator and an outlet 23 for a pumped return to an engine. A thermostat capsule 30 has a pushrod 32 which reacts against a spoked abutment 26 in the cold inlet 22 and is carried in a first valve member in the form of a valve spool 41 having a flange 46 which seats against a flat seat 52 on the main housing 25. The capsule 30 includes a capsule body 31 which is a push fit in a recess 40 in the valve spool 41 and abuts a wall 44 which separate the recess 40 from an end bore 42. The end housing 60 carries a plug 27 suspended on spokes in the hot inlet 21. The recess 40 has axial grooves (typically three) which each continue as an offset bore 38 opening into the end bore 42. The offset bores may be located substantially in alignment with the one or more axial grooves providing one or more a substantially continuous fluid passages along at least part of a length of the temperature responsive actuator.

The capsule 30 has a flange 34 which is clearance fit in a bore 53 in a second valve member 50, the bore 53 having a retaining washer 55 at one end and castellations 54 at the other end. The second valve member 50 has a conical skirt 56 which engages with a tapered seat 57 in the main housing 25. A spring 58 acts between the second valve member 50 and the valve spool 41 to urge the conical skirt 56 onto the tapered seat 57. The valve spool 41 has a cylindrical surface which extends through a central aperture in an annular washer 49, the washer being urged onto a sealing face 61 on the end housing 60 by a spring 43 which reacts against the valve spool 41. Alternatively, the pushrod 32 may extend through the central aperture of the washer 49. The retaining washer may be in sealing engagement with the push rod, or with the cylindrical surface which extends through the retaining washer 49. Another spring 33 may act between the valve spool 41 and the plug 27.

When coolant in the hot inlet 21 is below a first predetermined temperature, typically 80° C., the valve 20 prevents flow from the hot and cold inlets 21 and 22 to the outlet 23, the flange 46 being held against the seat 52 by springs 33 and 43. A very small leakage between the flange 46 and the seat 52 allows the capsule 30 to sense a temperature dominated by that in the hot inlet 21. As the temperature rises above 80° C. the capsule body 31 pushes against the spokes 26, via push rod 32, such that the valve spool 41 moves progressively towards the hot inlet 21. Initial movement of the valve spool 41 allows flow past the seat 52 so that coolant can flow from the hot inlet 21 through the bore 42 in the valve spool 41 and the offset bores 38, along the grooves 39 between the recess 40 and the capsule body 31 and past the castellations 54 to the outlet 23. During this initial movement of the valve spool 41, the second valve member 50 remains in its initial position with the conical skirt 56 engaged with the tapered seat 57. However, further movement of the valve spool 41 when the coolant in the hot inlet 21 is above a second predetermined temperature, e.g. about 85° C. causes the flange 34 of the capsule 30 to abut the castellations 54 and lift the conical skirt 56 away from the tapered seat 57 to allow flow through the cold inlet 22 past the valve member 50, the capsule flange 34 and the castellations 54 thus acting as a lost motion connection between the valve spool 41 and the second valve member 50. Above a third predetermined temperature, e.g. about 90° C., the plug 27 engages the bore 42 to restrict flow from the hot inlet 21. If the pump pressure becomes high, e.g. at higher engine speeds, the washer 49 can lift away from the sealing face 61 on the end housing 60 against spring 43 to allow direct flow from the hot inlet 21 to the outlet 23.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A temperature responsive control valve for use in an engine cooling system in which a pump circulates liquid coolant to an engine, coolant from the engine is returned to the pump through a radiator and a bypass arranged in parallel and the control valve controls flow as between the radiator and the bypass, the control valve comprising:

a housing defining a hot inlet which in use is connected to the bypass, a cold inlet which in use is connected to the radiator, an outlet which in use is connected to the pump, a first valve member to control the flow of coolant from the hot inlet to the outlet, a second valve member to control coolant flow from the cold inlet to the outlet and a temperature responsive actuator to move the first and second valve members, wherein the control valve is operable to substantially prevent coolant flow from the hot and cold inlets to the outlet when the temperature of the coolant sensed by the temperature responsive actuator is below a first predetermined temperature, to permit coolant flow only from the hot inlet to the outlet when the sensed temperature is between the first predetermined temperature and a second higher predetermined temperature and to permit coolant flow from both of the inlets to the outlet when the sensed temperature is above the second temperature, wherein the second valve member is spring biased onto a seat in the housing to prevent coolant flow from the cold inlet to the outlet when the temperature of the coolant sensed by the temperature responsive actuator is below the second predetermined temperature and is lifted from the seat by the first valve member when the temperature of the coolant sensed by the temperature responsive actuator exceeds the second predetermined temperature.

2. The control valve of in claim 1, wherein there is a lost motion connection between the first valve member and the second valve member.

3. The control valve of claim 2, wherein a biasing spring acts between the first valve member and the second valve member.

4. The control valve of claim 2, wherein the lost motion connection includes a flange on the temperature responsive actuator dispose to contact castellations fixed to the second valve member.

5. The control valve of in claim 1, wherein a biasing spring acts between the first valve member and the second valve member.

6. A temperature responsive control valve comprising:
a housing having a hot inlet, a cold inlet and an outlet;
a first valve member and a second valve member being configured to move within the housing to:
substantially prevent flow from the hot inlet and the cold inlet to the outlet when a sensed temperature is below a first temperature,
permit flow from the hot inlet and substantially prevent flow from the cold inlet when the sensed temperature is above the first temperature and below a second temperature, and
permit flow from both the hot inlet and the cold inlet to the outlet when a sensed temperature is above the second temperature;
a temperature responsive actuator disposed to move the first and second valve members within the housing in accordance with the sensed temperature;
a first bias configured to bias the first valve member toward preventing flow from the hot inlet to the outlet; and
a second bias configured to bias the second valve member toward preventing flow from the cold inlet to the outlet.

7. The temperature responsive control valve of claim 6, wherein the temperature responsive actuator is configured to act against the first bias and the second bias.

8. The temperature responsive control valve of claim 6, wherein the first valve member and the second member are coupled to one another with a lost motion connection.

9. The temperature responsive control valve of claim 8, wherein the temperature responsive actuator includes a thermally expansive capsule, the capsule having a capsule body and a capsule flange, a thermal expansion of the capsule body configured to push the first valve member in a first direction away from a seat increasing flow from the hot inlet to the outlet, and a thermal expansion of the capsule flange configured to move the second valve member in the first direction increasing flow from the cold inlet to the outlet.

10. The temperature responsive control valve of claim 9, further comprising castellations coupled to the second valve member and configured to be contacted by the capsule flange to move the second valve member in the first direction, the castellations being disposed to allow at least some of the flow from the hot inlet to the outlet between the castellations.

11. The temperature responsive control valve of claim 9, wherein the second valve member includes a bore therein, a retaining washer at one an end of the bore the capsule flange housed within the bore, a push rod coupled with the capsule flange and extending through a central aperture in the washer, a spoked abutment disposed within the cold inlet, the push rod in abutment with the spoked abutment.

12. The temperature responsive control valve of claim 11, the retaining washer in sealing engagement with the push rod.

13. The temperature responsive control valve of claim 6, wherein the first valve member is a valve spool having a wall therein separating a recess from an end bore, and wherein the temperature responsive actuator is push fit into the recess, the recess having one or more axial grooves therein, the wall including one or more offset bores located substantially in alignment with the one or more axial grooves providing one or more a substantially continuous fluid passages along at least part of a length of the temperature responsive actuator.

14. The temperature responsive control valve of claim 6, wherein the second valve member includes a conical skirt configured for sealing engagement with a tapered seat within the housing.

15. The temperature responsive control valve of claim 6, wherein the fluid is a coolant and the cold inlet is coupled with a radiator of an internal combustion engine, and the hot inlet is coupled with a bypass, and the outlet is coupled with a pump configured to pump the coolant to the internal combustion engine.

16. A control valve comprising:
a housing having a hot inlet, a cold inlet, and an outlet;
a temperature responsive capsule having a capsule body and a capsule flange;
a first valve member having a recess disposed to house at least part of the capsule body, the recess sized and shaped to allow a fluid from the hot inlet to contact the capsule, at least part of a thermal expansion of the capsule body causing the capsule body to push the first valve member in a first direction;
a second valve member having a bore, the capsule flange disposed within the bore, the second valve member having members configured to be contacted by the capsule flange, at least part of a thermal expansion of the capsule flange causing the capsule flange to push the second valve member in the first direction; and
a bias between the first valve member and the second valve member biasing the first valve member away from the second valve member.

17. The control valve of claim 16, wherein a movement of the first valve member in the first direction configured to permit flow of a coolant from the hot inlet, and a movement of the second valve member configured to permit flow of a coolant from the cold inlet.

* * * * *

UNITED STATES PATENT AND TRADEMARK OFFICE
CERTIFICATE OF CORRECTION

PATENT NO.        : 8,047,450 B2
APPLICATION NO.   : 12/327556
DATED             : November 1, 2011
INVENTOR(S)       : William Richard Hutchins It is certified that error appears in the above-identified patent and that said Letters Patent is hereby corrected as shown below:

Title Page, Item (73), please correct

"Ford Global Technologies, LLC, Dearborn, MI (US)"

to read

"Ford Global Technologies, LLC, Dearborn, MI (US);
Jaguar Cars Limited, Conventry (GB)"

Signed and Sealed this
Third Day of April, 2012

David J. Kappos
*Director of the United States Patent and Trademark Office*